(12) United States Patent
Griffiths et al.

(10) Patent No.: US 11,597,492 B2
(45) Date of Patent: Mar. 7, 2023

(54) SLIDING DOOR

(71) Applicant: Bell Textron Inc., Fort Worth, TX (US)

(72) Inventors: Paul Charles Griffiths, Roanoke, TX (US); Bryan Sugg, Midlothian, TX (US); Samuel Bryk, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 483 days.

(21) Appl. No.: 16/733,244

(22) Filed: Jan. 3, 2020

(65) Prior Publication Data

US 2020/0216160 A1    Jul. 9, 2020

Related U.S. Application Data

(60) Provisional application No. 62/788,082, filed on Jan. 3, 2019.

(51) Int. Cl.
*B64C 1/14* (2006.01)
*E05D 15/10* (2006.01)
*E05D 15/06* (2006.01)

(52) U.S. Cl.
CPC .......... *B64C 1/1438* (2013.01); *B64C 1/1461* (2013.01); *E05D 15/0621* (2013.01); *E05D 15/10* (2013.01); *E05Y 2900/502* (2013.01); *E05Y 2900/531* (2013.01)

(58) Field of Classification Search
CPC . B64C 1/1438; B64C 1/1461; E05D 15/0621; E05D 15/10; E05Y 2900/502; E05Y 2900/531
See application file for complete search history.

(56) References Cited

U.S. PATENT DOCUMENTS

| 10,384,519 | B1 * | 8/2019 | Brown | B60J 5/047 |
|---|---|---|---|---|
| 2009/0173825 | A1 * | 7/2009 | Dehn | B64C 1/1438 |
| | | | | 244/129.5 |
| 2010/0059628 | A1 * | 3/2010 | Kobayashi | B64C 1/1438 |
| | | | | 244/129.5 |
| 2016/0245006 | A1 * | 8/2016 | Joussellin | E05D 13/006 |
| 2019/0119966 | A1 * | 4/2019 | Barbieri | B64C 1/1461 |
| 2020/0347656 | A1 * | 11/2020 | Groninga | E05F 17/00 |

* cited by examiner

*Primary Examiner* — Rodney A Bonnette
(74) *Attorney, Agent, or Firm* — Lightfoot & Alford PLLC (57) ABSTRACT

Systems and methods include providing an aircraft with a fuselage having a sliding door system disposed on at least one side of the fuselage. The sliding door system includes a forward sliding door having an upper slide rail and a lower slide rail, a rearward sliding door having an upper slide rail and a lower slide rail, an upper rail coupled to each of the upper slide rail of the forward sliding door and the upper slide rail of the rearward sliding door, a lower rail coupled to each of the lower slide rail of the forward sliding door and the lower slide rail of the rearward sliding door, and a plurality of actuators coupled to each of the upper rail and the lower rail and configured to displace and retract the forward sliding door and the rearward sliding door linearly with respect to the fuselage.

15 Claims, 11 Drawing Sheets

SLIDING DOOR

CROSS-REFERENCE TO RELATED APPLICATIONS

This application claims priority to U.S. Provisional Patent Application No. 62/788,082, filed on Jan. 3, 2019 by Paul Charles Griffiths, et al., and titled "SLIDING DOOR," the disclosure of which is incorporated by reference in its entirety.

STATEMENT REGARDING FEDERALLY SPONSORED RESEARCH OR DEVELOPMENT

Not applicable.

BACKGROUND

Cargo and passenger aircraft require efficient and safe loading of both cargo and passengers into the aircraft. Increasing the size of access openings (e.g., cargo doors, passenger entrances and exits, etc.) in the fuselage of such aircraft relative to the overall size of the aircraft itself provides easier and quicker access to the inside of the fuselage, which not only provides for more efficient cargo loading but also allows passengers to enter and exit the fuselage more safely and quickly. However, increasing the size of these access openings often creates many design challenges, such as providing adequate mounting support and an airtight seal between the access opening and the fuselage of the aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
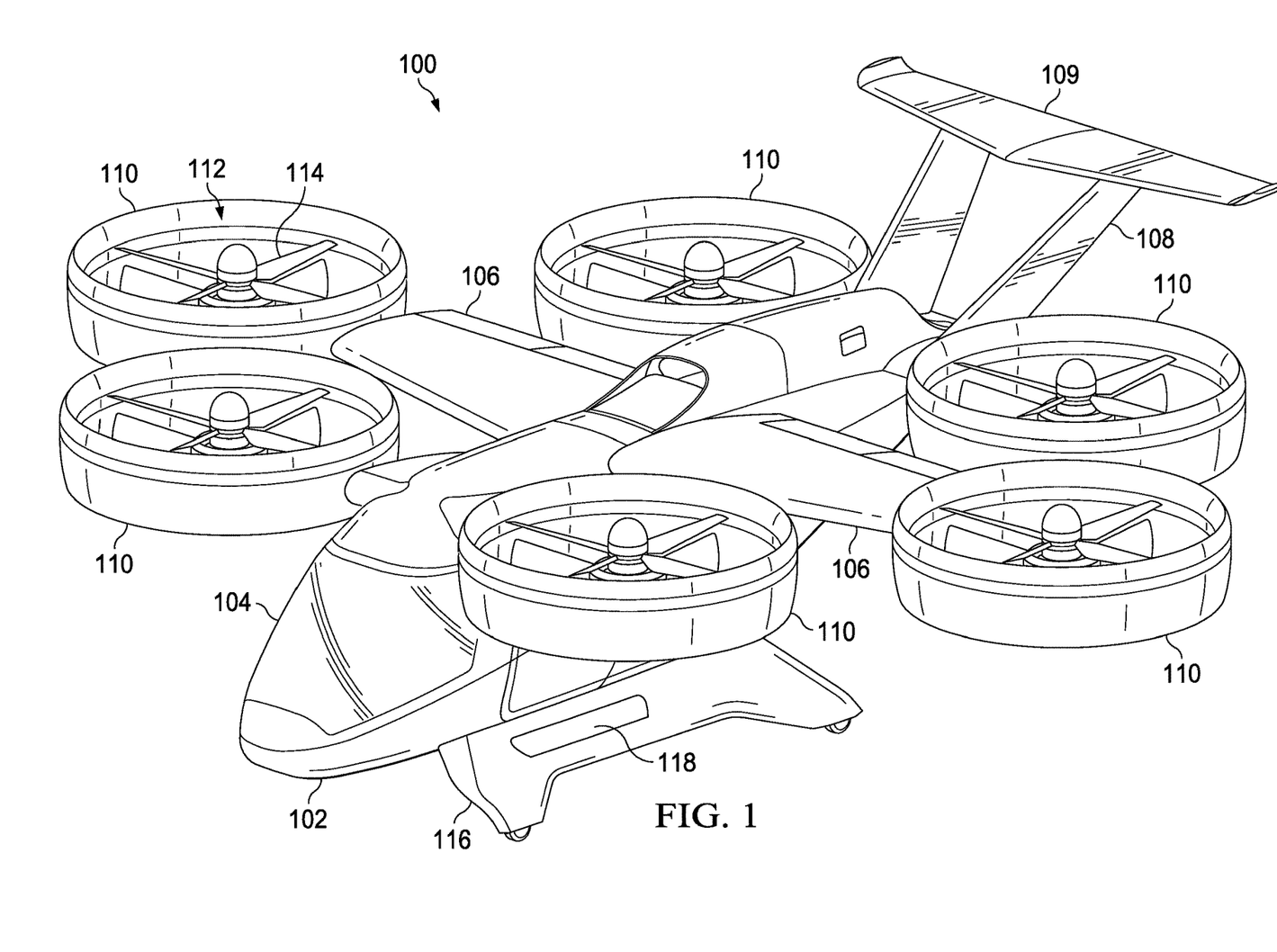
FIG. 1 is an oblique view of an aircraft according to this disclosure.

FIG. 1 is an oblique view of an aircraft 100 according to this disclosure. Aircraft 100 is generally configured as a vertical takeoff and landing (VTOL) aircraft that is operable in an airplane mode associated with forward flight and a helicopter mode associated with vertical takeoff from and landing to a landing zone. Aircraft 100 comprises a fuselage 102, a cockpit and/or passenger compartment 104, a plurality of wings 106 extending from the fuselage 102, and an empennage 108 having a horizontal stabilizer 109. Aircraft 100 also comprises a plurality of ducted fans 110 that may be selectively rotated with respect to the fuselage 102 in order to transition the aircraft 100 between the airplane mode and the helicopter mode.

Each ducted fan 110 comprises a rotor system 112 having a plurality of selectively rotatable rotor blades 114 configured to generate thrust when selectively rotated in each of the lane mode and the helicopter mode. In the embodiment shown, aircraft 100 comprises six ducted fans 110. Two ducted fans 110 are carried by, supported by and/or otherwise coupled to the fuselage 102, two ducted fans 110 are coupled to the wings 106, and two ducted fans 110 are carried by, supported by, and/or otherwise coupled to the empennage 108. However, in alternative embodiments, any number of ducted fans 110 may be used depending on the configuration and design of the aircraft. Aircraft 100 also comprises a landing gear 116 configured to support aircraft 100 when not in flight. Additionally, landing gear 116 comprises an auxiliary folding step system 118 for use by occupants entering and exiting aircraft 100.

Figure 2:
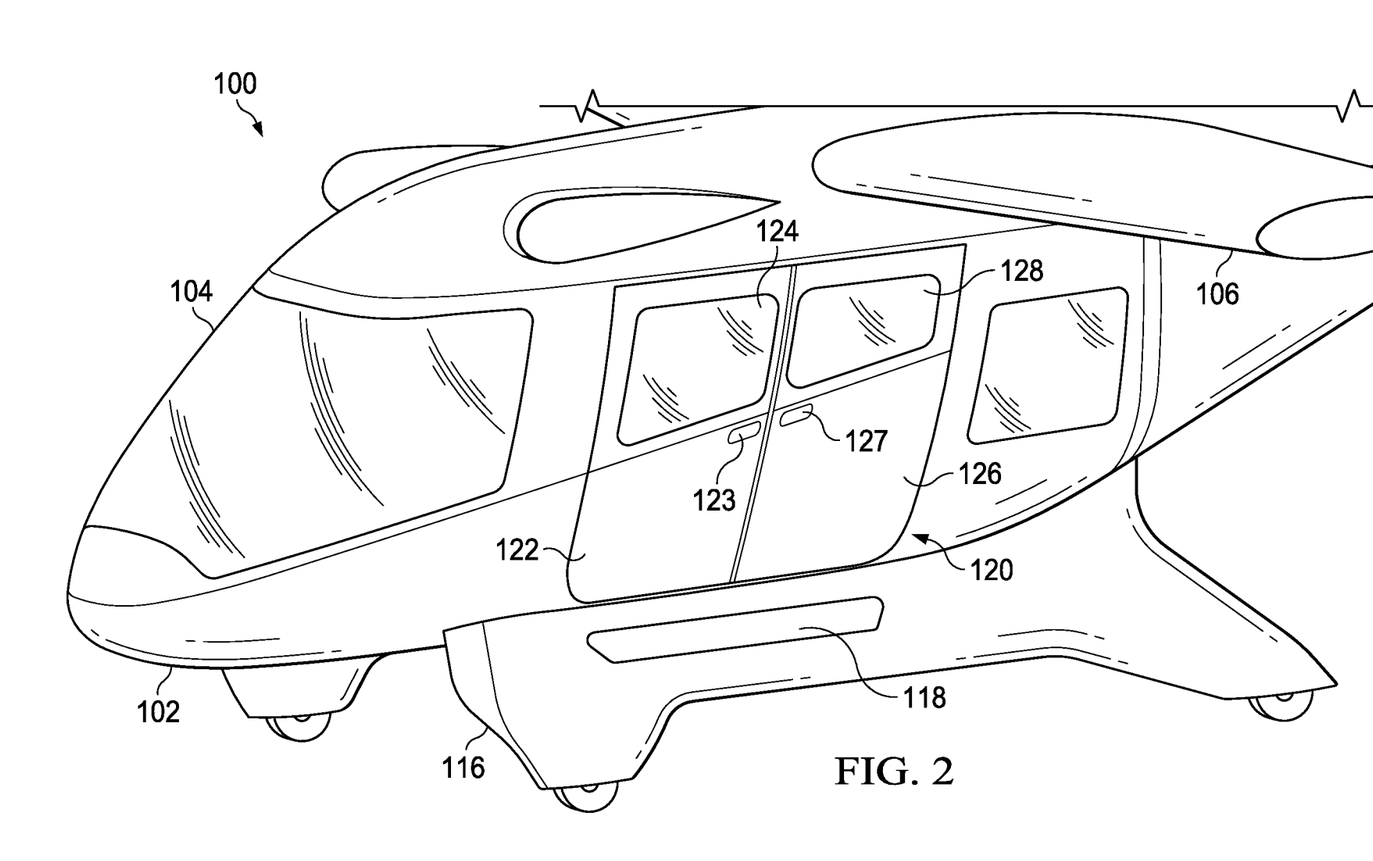
FIG. 2 is a partial detailed oblique view of the aircraft of FIG. 1.

FIG. 2 is a partial detailed oblique view of the aircraft 100 of FIG. 1. To allow ingress and egress of passengers and/or loading of cargo into the passenger compartment 104 of the aircraft 100, aircraft 100 comprises a sliding door system 120 disposed on at least one side of the fuselage 102. In some embodiments, aircraft 100 may comprise a sliding door system 120 on each side of the fuselage 102 of the aircraft 100. In the embodiment shown, the sliding door system 120 comprises a dual sliding door system having a first forward sliding door 122 and a second rearward sliding door 126. The first door 122 comprises a door handle 123 that allows the first door 122 to be opened from the outside of the aircraft 100. The second door 126 also comprises a door handle 127 that allows the second door 126 to be opened from the outside of the aircraft 100. In some embodiments, the door handles 123, 127 may be hidden and/or recessed within their respective door 122, 126. Additionally, in some embodiments, the first door 122 and the second door 126 may also comprise a respective window 124, 128. As shown, both doors 122, 126 are in the closed position. In the closed position, outer surfaces of each door 122, 126 remain substantially flush with the surrounding outer surface of the fuselage 102. As such, it will be appreciated that the curvature of the doors 122, 126 match the curvature of the surrounding outer surface of the fuselage 102 to form the smooth, aerodynamic shape of the fuselage 102.

Figure 3:
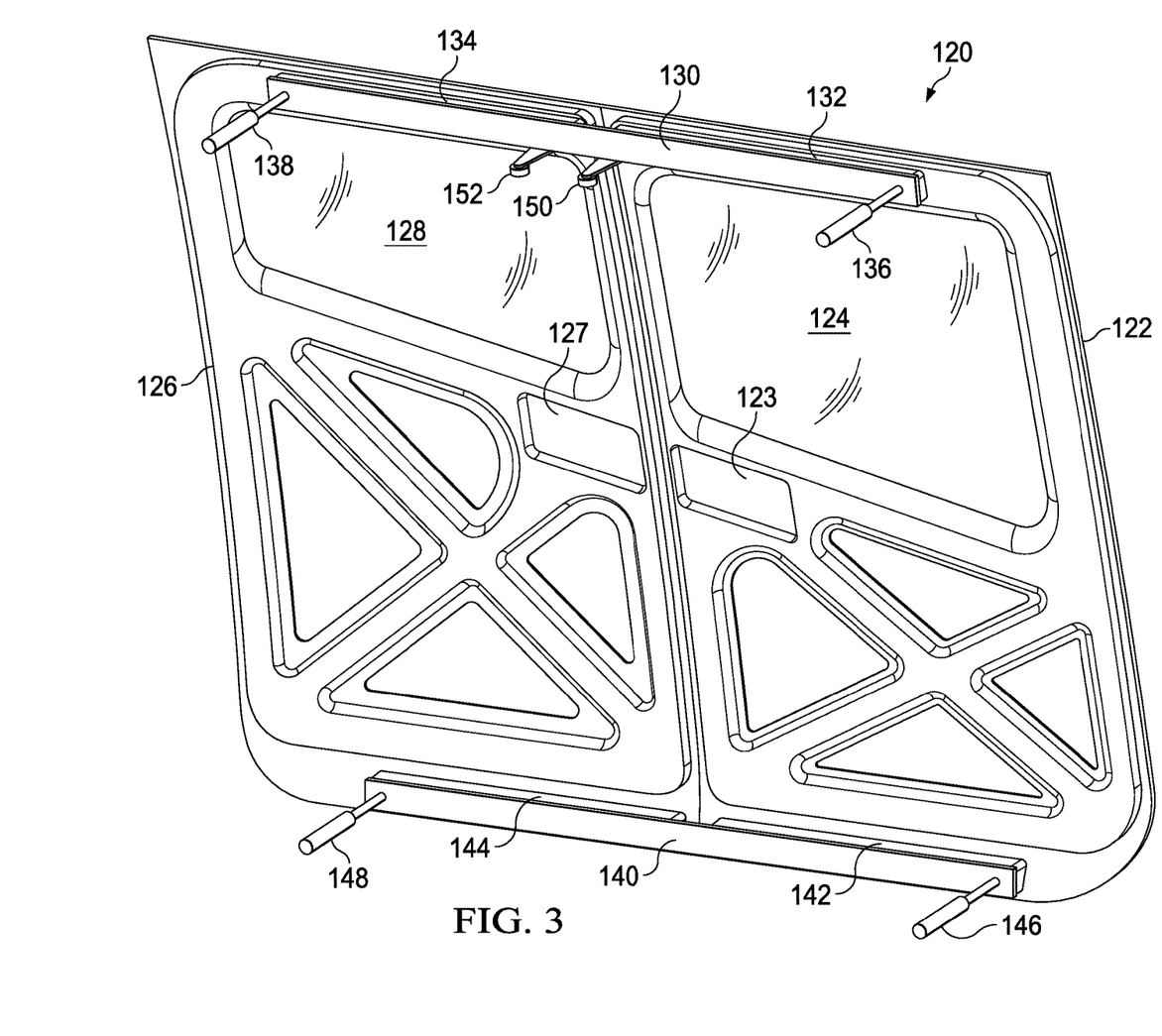
FIG. 3 is an oblique inner view of a sliding door system of the aircraft of FIG. 1 as viewed from inside a passenger compartment of the aircraft.

FIG. 3 is an oblique inner view of the sliding door system 120 of FIG. 2 in a closed position as viewed from inside the passenger compartment 104 of the aircraft 100. The sliding door system 120 comprises an upper rail 130 coupled to each of an upper slide rail 132 associated with the first door 122 and an upper slide rail 134 associated with the second door 126, allowing the doors 122, 126 to slide linearly with respect to the upper rail 130 when the slide rails 132, 134 extend. A first actuator 136 and a second actuator 138 are each coupled to the upper rail 130. Additionally, the first door 122 comprises a track roller 150 configured to be received in an auxiliary track associated with the fuselage 102. The sliding door system 120 also comprises a lower rail 140 coupled to each of a lower slide rail 142 associated with the first door 122 and a lower slide rail 144 associated with the second door 126, allowing the doors 122, 126 to slide linearly with respect to the lower rail 140 when the slide rails 142, 144 extend. A first actuator 146 and a second actuator 148 are each coupled to the lower rail 140. Additionally, the second door 126 comprises a track roller 152 configured to be received in an auxiliary track associated with the fuselage 102.

To allow ingress and egress of passengers and/or loading of cargo into the passenger compartment 104, each of the actuators 136, 138, 146, 148 may be selectively operated to apply pressure to the upper rail 130 and the lower rail 140 to displace the doors 122, 126 linearly away from the fuselage 102 and past the bulkhead of the fuselage 102. In some embodiments, the actuators 136, 138, 146, 148 may be electro-mechanical, hydraulic, mechanical (e.g., spring-loaded), pneumatic, or equivalents thereof. Once the doors 122, 126 are displaced from the bulkhead of the fuselage 102, the upper slide rail 132 and the lower slide rail 142 allow the first door 122 to slide forward along the fuselage 102, while the upper slide rail 134 and the lower slide rail 144 allow the second door 126 to slide rearward along the fuselage 102. To enable the doors to slide along the fuselage 102, the actuators 136, 138, 146, 148 are configured to displace the doors 122, 126 at least about four inches in order to displace the doors 122, 126 beyond the bulkhead of the fuselage 102. However, in other embodiments, the actuators 136, 138, 146, 148 may be configured to displace the doors 122, 126 at least about 5 inches.

In the embodiment shown, the doors 122, 126 are displaced away from the fuselage 102 simultaneously via the actuators 136, 138, 146, 148 acting on the upper rail 130 and the lower rail 140. However, the doors 122, 126 are configured to slide independently via their associated slide rails 132, 134, 142, 144. In alternative embodiments, each door 122, 126 may comprise independent upper and lower rails that allows each door 122, 126 to be displaced independently. Furthermore, in other embodiments, the sliding door system 120 may comprise only one door. During sliding of the doors 122, 126, track roller 150 is configured to move in an auxiliary track associated with the fuselage 102 to keep the first door 122 displaced from the fuselage 102, and track roller 152 is also configured to move in an auxiliary track associated with the fuselage 102 to keep the second door 126 displaced from the fuselage 102.

Figure 4:
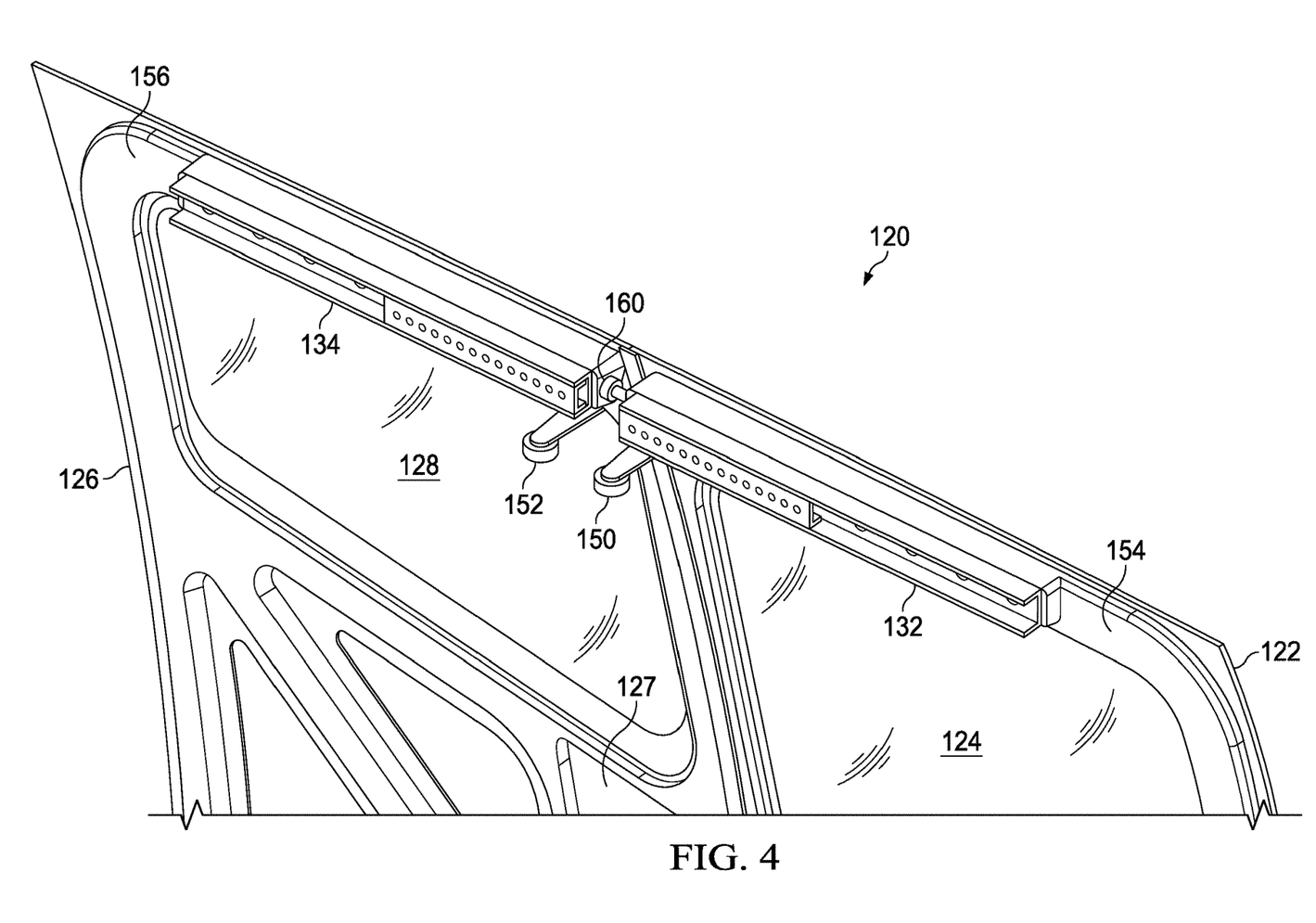
FIG. 4 is an oblique inner view of an upper portion of the high displacement sliding door system of FIG. 3 as viewed from inside a passenger compartment of the aircraft.

FIG. 4 is a detailed oblique inner view of the upper portion of the sliding door system 120 of FIG. 3 in the closed position as viewed from inside the passenger compartment 104 of the aircraft 100. As shown in FIG. 4, the upper rail 130 and the actuators 136, 138 are removed for clarity. Upper slide rails 132, 134 are generally configured as linear sliding tracks that utilize ball bearings for smooth efficient operation during sliding. Channels 154, 156 may be formed around each door 122, 126, respectively, to prevent rainwater and/or other debris from entering the passenger compartment 104 of the fuselage 102. This allows for a unitary seal about each door 122, 126, which is superior to other doors having external tracks that require multiple seals. Additionally, a seal 158 may be disposed between the doors 122, 126 to form an airtight seal between the doors 122, 126 to further enhance sealing of the passenger compartment 104 of the fuselage 102 from the external environment. Still further, at least in some embodiments, an upper bump stop 160 associated with the upper slide rails 132, 134 may prevent the doors 122, 126 from colliding when slid towards each other via their associated slide rails 132, 134, 142, 144 and/or magnetically secure the doors 122, 126 together so that the actuators 136, 138, 146, 148 may be selectively operated to retract the doors 122, 126 within the bulkhead of the fuselage 102 to the closed position.

Figure 5:
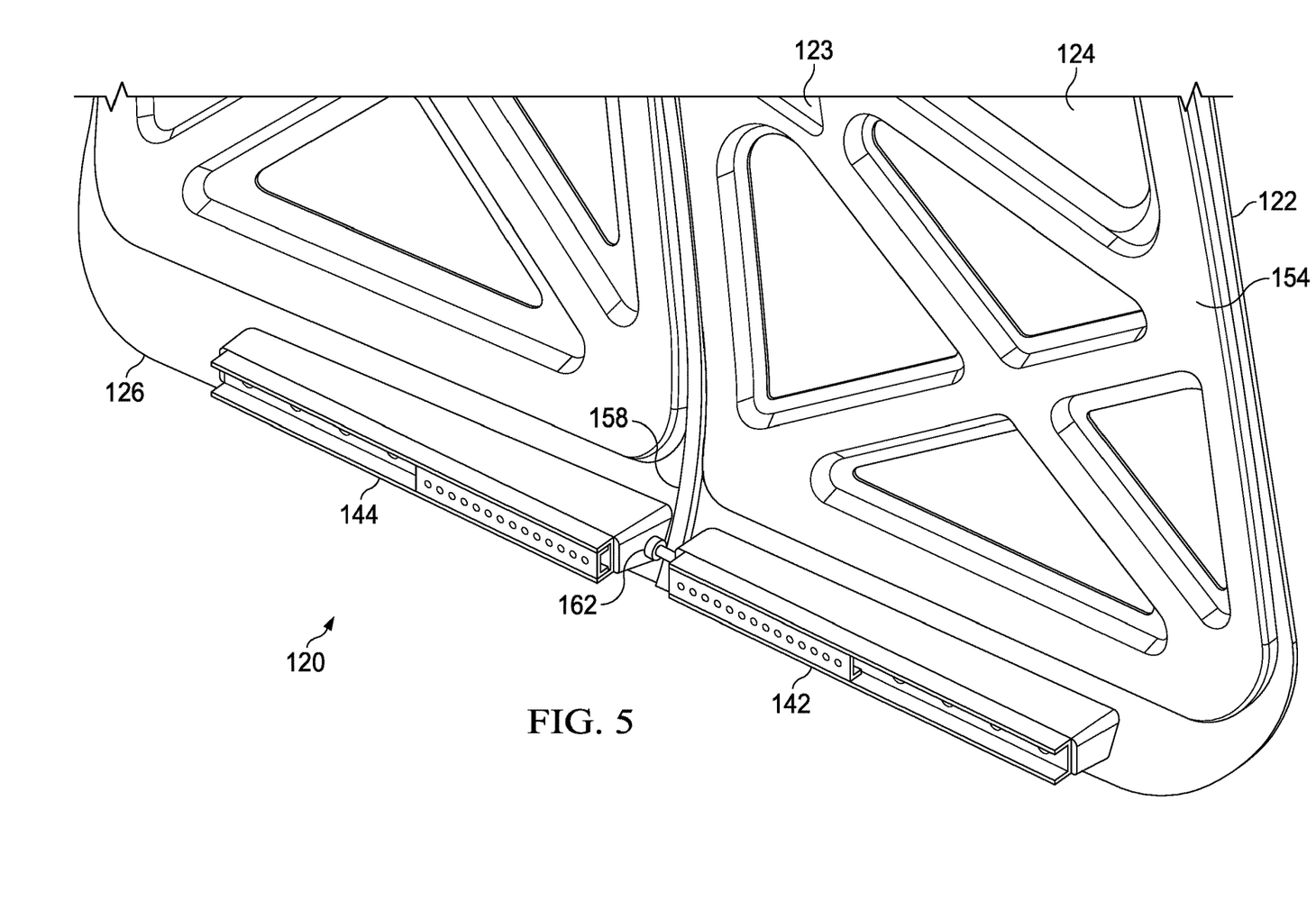
FIG. 5 is an oblique inner view of a lower portion of the sliding door system of FIG. 3 as viewed from inside a passenger compartment of the aircraft.

FIG. 5 is a detailed oblique inner view of the lower portion of the sliding door system 120 of FIG. 3 in the closed position as viewed from inside the passenger compartment 104 of the aircraft 100. As shown in FIG. 5, the lower rail 140 and the actuators 146, 148 are removed for clarity. Lower slide rails 142, 144 are also generally configured as linear sliding tracks that utilize ball bearings for smooth efficient operation during sliding. Channels 154, 156 extend around each door 122, 126, respectively, to prevent rainwater and/or other debris from entering the passenger compartment 104 of the fuselage 102. In some embodiments, sliding door system 120 may also comprise a lower bump stop 162 associated with the lower slide rails 142, 144 which may be substantially similar to bump stop 160 to prevent the doors 122, 126 from colliding when slid towards each other via their associated slide rails 132, 134, 142, 144 and/or magnetically secure the doors 122, 126 together in order for the actuators 136, 138, 146, 148 to retract the doors 122, 126 within the bulkhead of the fuselage 102 to the closed position.

Figure 6:
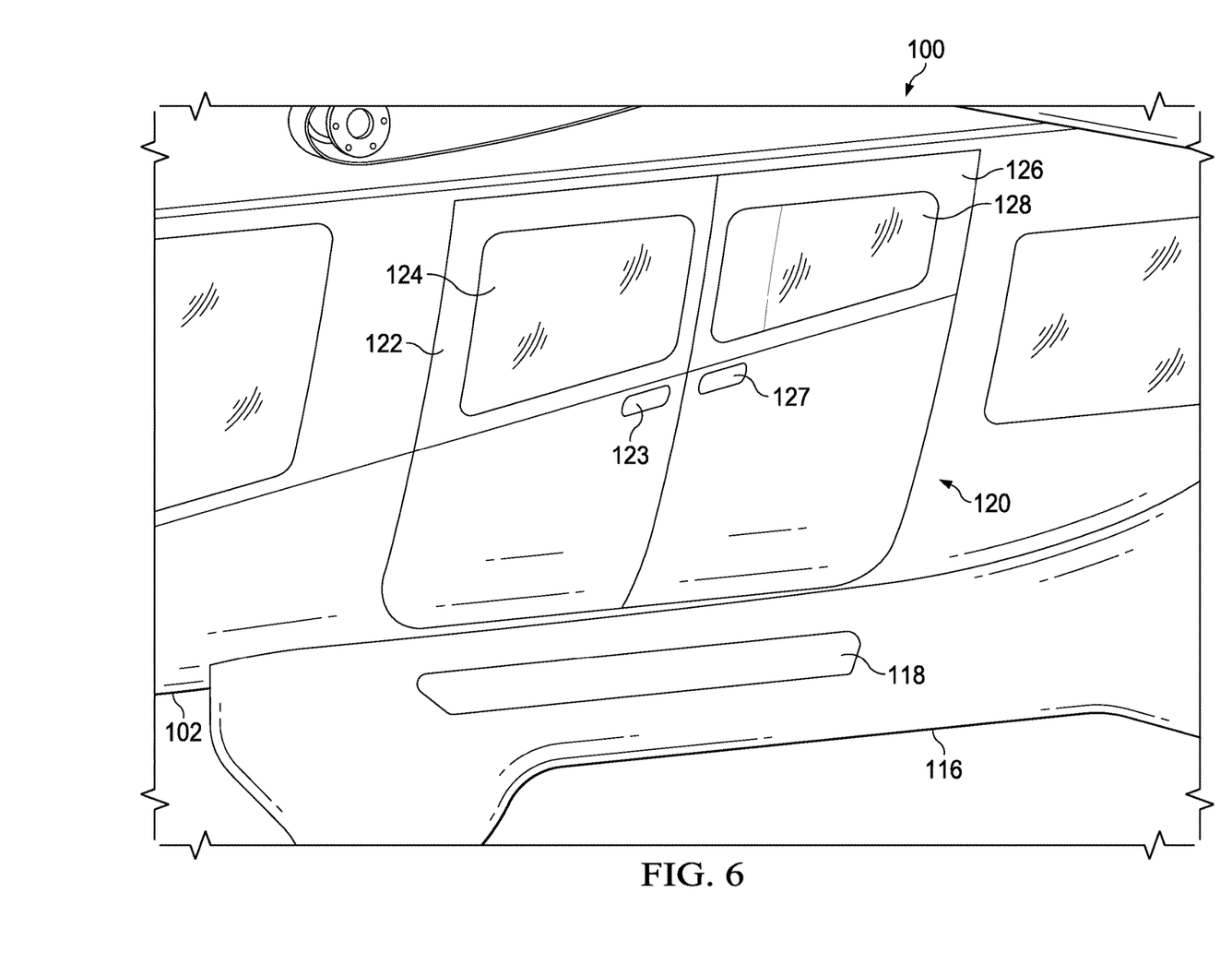
FIG. 6 is an oblique outer view of the sliding door system of FIG. 3 in a closed position as viewed from outside of the aircraft.

FIG. 6 is an oblique outer view of the sliding door system 120 of FIG. 3 in the closed position as viewed from outside the aircraft 100. Most generally, the closed position is associated with the doors 122, 126 being secured for flight of the aircraft 100 when the actuators 136, 138, 146, 148 have retracted the doors 122, 126 within the bulkhead of the fuselage 102, such that the doors form a fluid tight seal with the bulkhead of the fuselage 102 of the aircraft 100.

Figure 7:
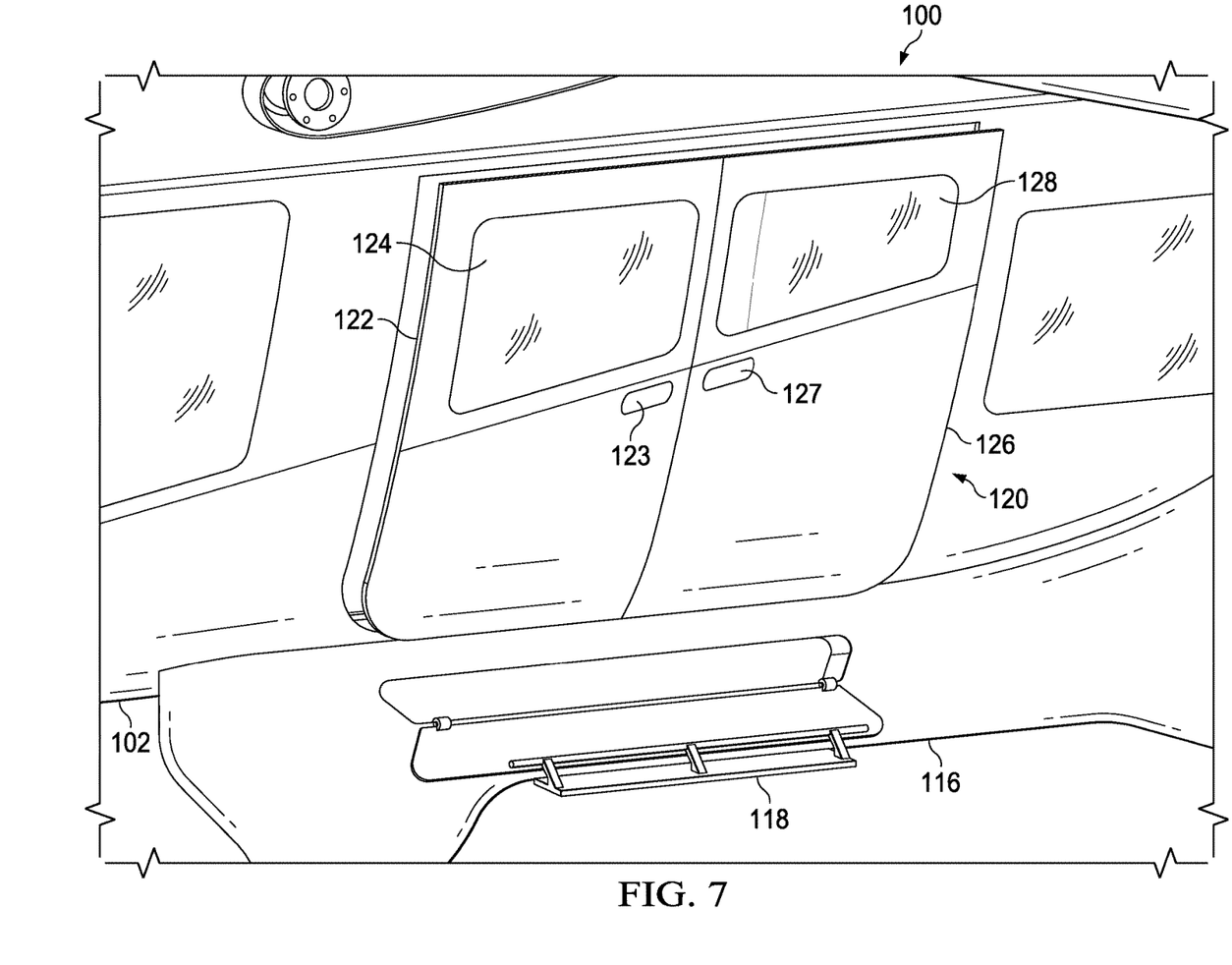
FIG. 7 is an oblique outer view of the sliding door system of FIG. 3 in a displaced position as viewed from outside of the aircraft.

FIG. 7 is an oblique outer view of the sliding door system 120 of FIG. 3 in a displaced position as viewed from outside the aircraft 100. To allow the doors 122, 126 to slide open via their respective slide rails 132, 134, 142, 144, the actuators 136, 138, 146, 148 of the sliding door system 120 must first be selectively operated to apply pressure to the upper rail 130 and the lower rail 140 to displace the doors 122, 126 linearly away from the fuselage 102 and past the bulkhead of the fuselage 102 as shown in FIG. 7. Similarly, to retract the doors 122, 126 to the closed position from the displaced position, each of the actuators 136, 138, 146, 148 may be selectively operated to relieve or retract pressure on the upper rail 130 and the lower rail 140 to retract the doors 122, 126 linearly towards from the fuselage 102 and into the bulkhead of the fuselage 102. As stated, the actuators 136, 138, 146, 148 may be electro-mechanical, hydraulic, mechanical (e.g., spring-loaded), pneumatic, or equivalents thereof. Operation of the sliding door system 120 and the actuators 136, 138, 146, 148 may be initiated via a passenger actuating either of the door handles 123, 127 of the doors 122, 126. However, a safety interlock may prevent operation of the actuators 136, 138, 146, 148 via actuation of the either of the door handles 123, 127 when the aircraft 100 is in flight.

In some embodiments, operation of the actuators 136, 138, 146, 148 that cause the doors 122, 126 to displace may be remote controlled via a remotely located control center, a control center proximate to the aircraft 100, and/or a smart communication device. In some embodiments, operation of the actuators 136, 138, 146, 148 may be initiated by a pilot or co-pilot of the aircraft 100 via a flight control system, cockpit controls, or other application specific control system of the aircraft 100. This may be beneficial to displace the doors 122, 126 during hover or vertical descent in order to allow for efficient loading of cargo and/or passengers upon a landing event. Furthermore, at least in some embodiments, operation of the actuators 136, 138, 146, 148 may be automatically controlled by a flight control system or other application specific control system of the aircraft 100 in response to a landing event or actuation of one or more of the door handles 123, 127 from the exterior of the aircraft 100. Additionally, in some embodiments, operation of the sliding door system 120 may also cause the auxiliary folding step system 118 to deploy to the deployed position as shown in FIG. 7 to aid passengers in loading and unloading or assist operators or other ground crew while loading cargo.

Figure 8:
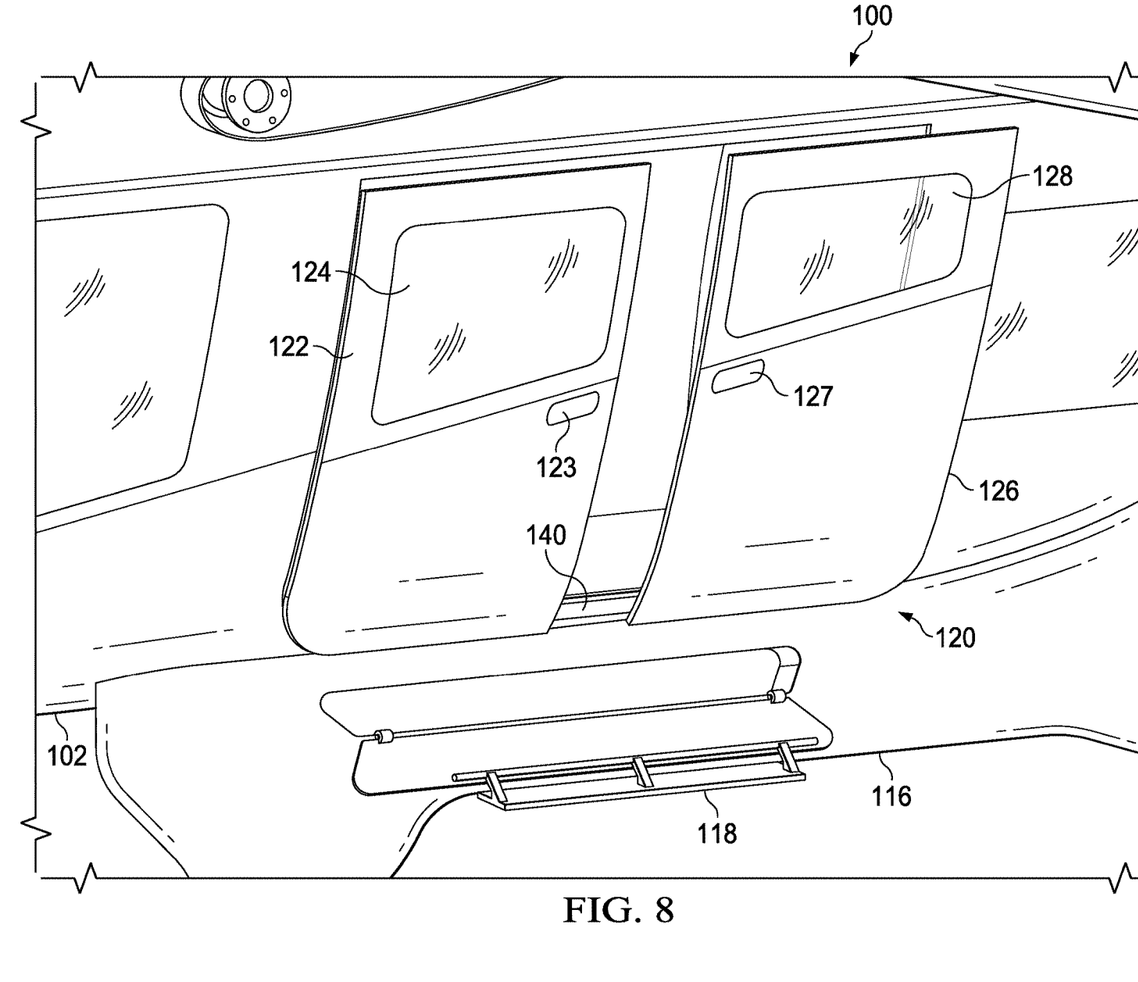
FIG. 8 is an oblique outer view of the sliding door system of FIG. 3 in a displaced, partially open position as viewed from outside of the aircraft.

FIG. 8 is an oblique outer view of the sliding door system 120 of FIG. 3 in a displaced, partially open position as viewed from outside the aircraft 100. Once the doors 122, 126 are displaced from the bulkhead of the fuselage 102 via operation of the actuators 136, 138, 146, 148, the upper slide rail 132 and the lower slide rail 142 allow the first door 122 to slide forward along the fuselage 102, while the upper slide rail 134 and the lower slide rail 144 allow the second door 126 to slide rearward along the fuselage 102. To enable the doors to slide along the fuselage 102, the actuators 136, 138, 146, 148 are configured to displace the doors 122, 126 beyond the bulkhead of the fuselage 102. Accordingly, while the doors are displaced simultaneously via the rails 130, 140, the doors 122, 126 may slide independently forward and rearward, respectively. Further, once displaced, the doors 122, 126 may be manually slid open and closed via their respective slide rails 132, 134, 142, 144. However, in other embodiments, sliding of the doors 122, 126 may be automatically actuated or controlled in a manner substantially similar to operation of the actuators 136, 138, 146, 148 disclosed herein. Furthermore, during sliding of the doors 122, 126, track rollers 150, 152 move within an auxiliary track associated with the fuselage 102 to keep the first door 122 and second door 126 displaced from the fuselage 102, thereby preventing contact between the doors 122, 126 and the fuselage 102.

Figure 9:
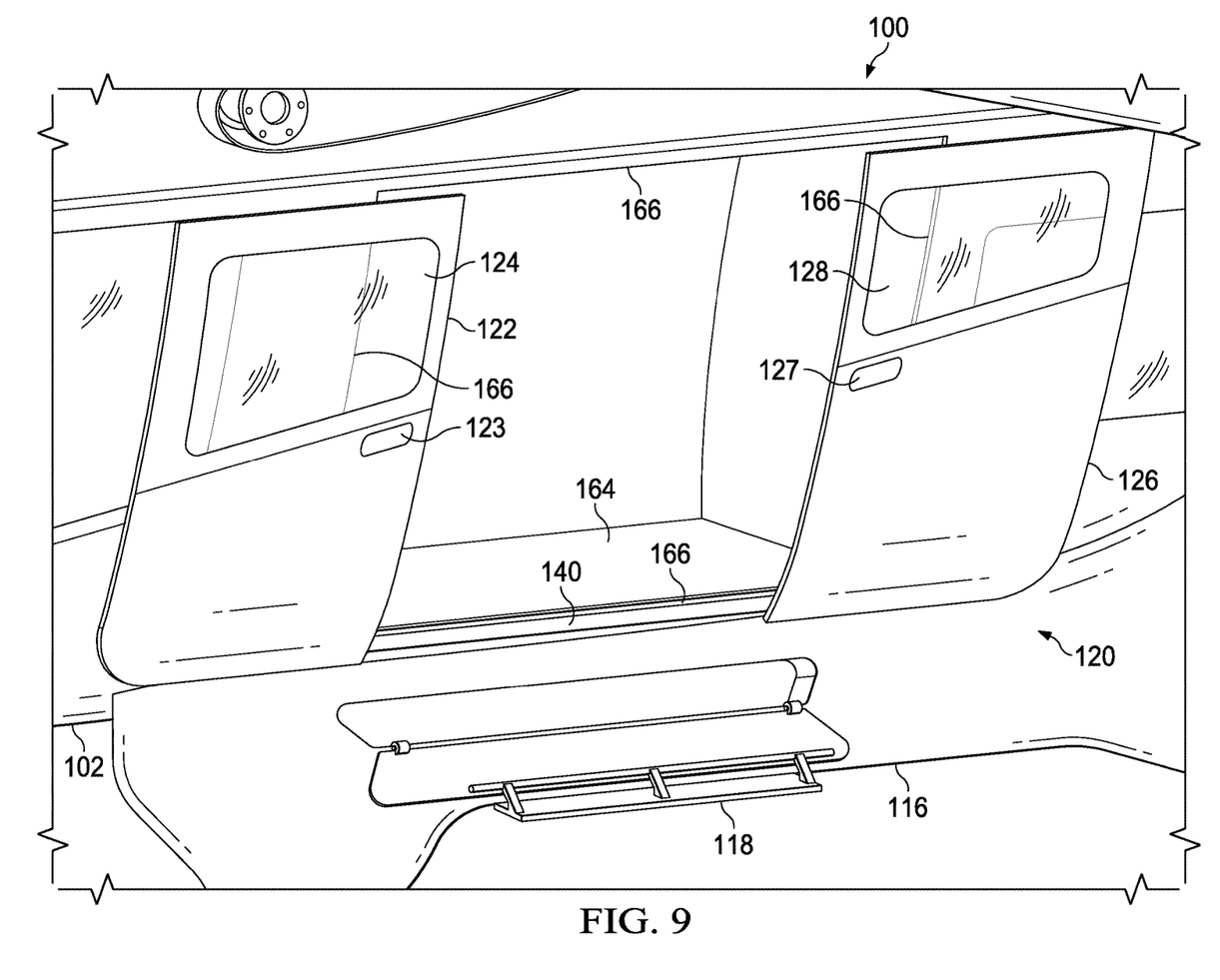
FIG. 9 is an oblique outer view of the sliding door system of FIG. 3 in a displaced, fully open position as viewed from outside of the aircraft.

FIG. 9 is an oblique outer view of the sliding door system 120 of FIG. 3 in a displaced, fully open position as viewed from outside the aircraft 100. When the doors 122, 126 are displaced and fully open, no slide rails 132, 134, 142, 144 or other sliding equipment is visible or protrudes from the exterior of the aircraft 100. The lower rail 140 is disposed outboard of the fuselage 102 and received beneath the fuselage floor 164 within at least a portion of the fuselage 102. This is due in part to the curvature of the fuselage 102. As such, the risk of a passenger contacting the lower rail 140 or lower slide rails 142, 144 when entering or exiting the passenger compartment 104 is averted. Another benefit of the sliding door system 120 is by avoiding locating the rails 130, 140 and the slide rails 132, 134, 142, 144 externally to the fuselage 102, the doors 122, 126 can be pulled into the bulkhead of the fuselage 102 to compress door seals 166, thereby creating a reliable, superior fluid tight seal as compared to sliding doors with external slide rails. Further, by providing channels 154, 156 formed around each door 122, 126, rainwater and/or other debris is prevented from entering the passenger compartment 104 of the fuselage 102, thereby further enhancing the seal between the doors 122, 126 and the fuselage 102 by allowing a unitary seal about each door 122, 126, which is superior to other doors with external slide rails or tracks which traditionally require multiple seals.

Figure 10:
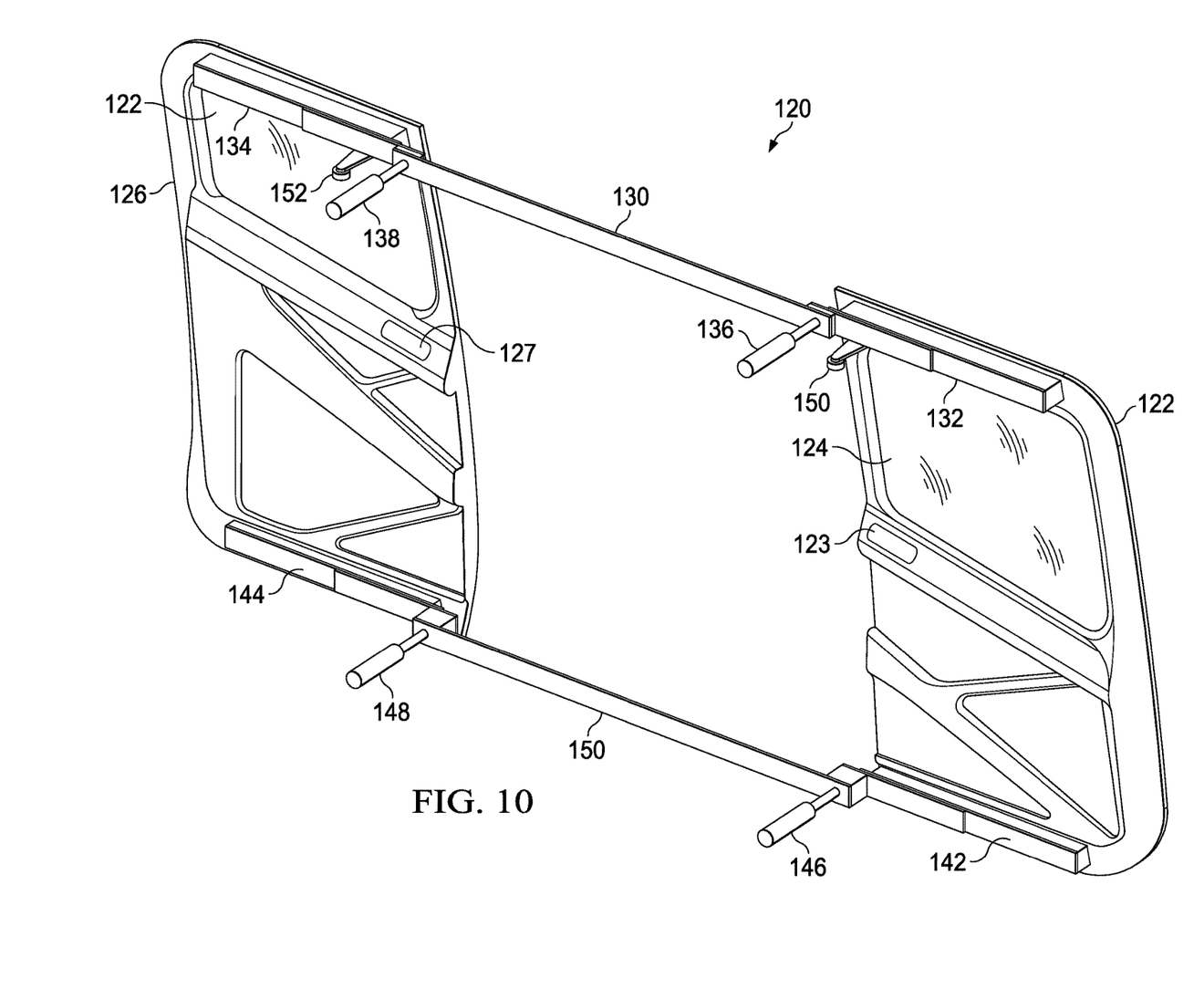
FIG. 10 is an oblique inner view of the sliding door system of FIG. 3 in the displaced and fully open position of FIG. 9 as viewed from inside the passenger compartment of the aircraft.

FIG. 10 is an oblique inner view of the sliding door system 120 of FIG. 3 in the displaced and fully open position of FIG. 9 as viewed from inside the passenger compartment 104 of the aircraft 100. When the doors 122, 126 are displaced and fully open, a maximum area for ingress and egress to and from the passenger compartment 104 is created. Furthermore, it will be appreciated that each door 122, 126 is fully contoured to the shape of the fuselage 102, and the front and rear edges of the doors 122, 126 are angled to maximize the position of the passengers in the passenger compartment 104 of the aircraft 100. These features collectively maximize the ergonomic ingress and egress of the sliding door system 120, thereby providing a more efficient, ergonomic, and safer dual sliding door system as compared to traditional sliding door systems with external slide rails.

Figure 11:
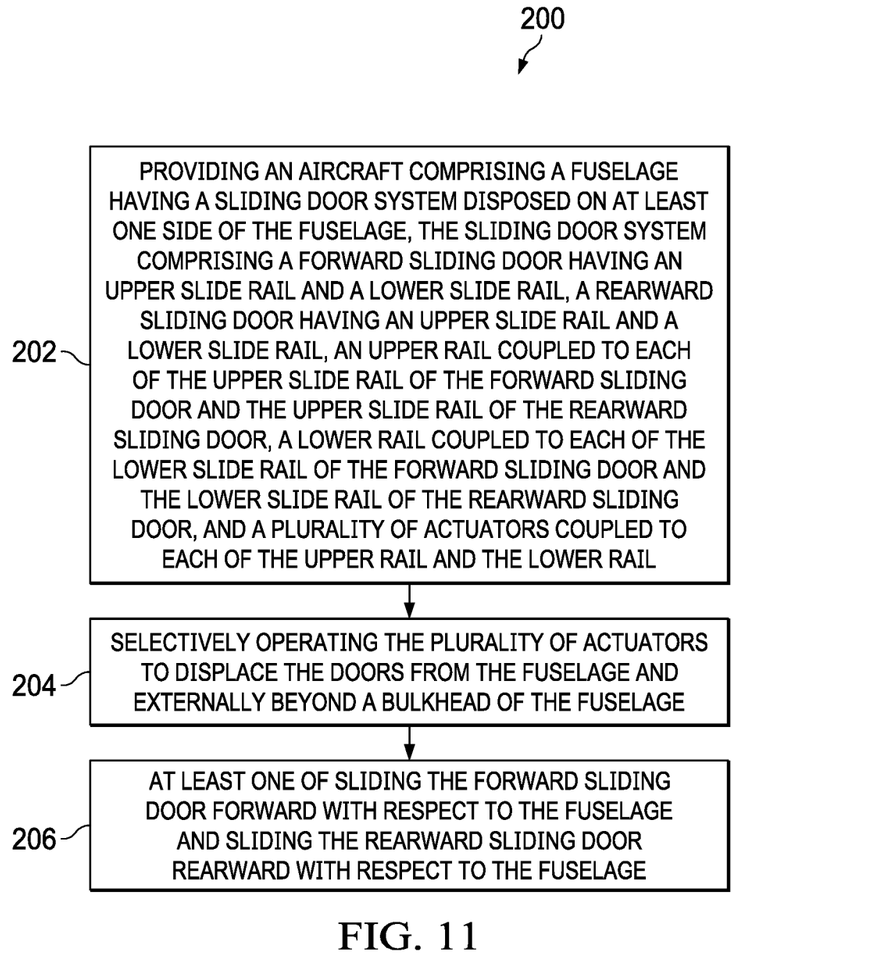
FIG. 11 is a flowchart of a method of operating an aircraft according to this disclosure.

FIG. 11 is a flowchart of a method 200 of operating an aircraft 100 according to this disclosure. Method 200 begins at block 202 by providing an aircraft 100 comprising a fuselage 102 having a sliding door system 120 disposed on at least one side of the fuselage 102. In some embodiments, the sliding door system 120 may comprise a forward sliding door 122 having an upper slide rail 132 and a lower slide rail 142, a rearward sliding door 126 having an upper slide rail 134 and a lower slide rail 144, an upper rail 130 coupled to each of the upper slide rail 132 of the forward sliding door 122 and the upper slide rail 134 of the rearward sliding door 126, a lower rail 140 coupled to each of the lower slide rail 142 of the forward sliding door 122 and the lower slide rail 144 of the rearward sliding door 126, and a plurality of actuators 136, 138, 146, 148 coupled to each of the upper rail 130 and the lower rail 140 and configured to displace and retract the forward sliding door 122 and the rearward sliding door 126 linearly with respect to the fuselage 102.

Method 200 continues at block 204 by selectively operating the plurality of actuators 136, 138, 146, 148 to displace the doors 122, 126 from the fuselage 102 and externally beyond the bulkhead of the fuselage 102. In some embodiments, selective operation of the actuators 136, 138, 146, 148 may be initiated via a passenger actuating either door handles 123, 127 of the doors 122, 126, via a remotely located control center, a control center proximate to the aircraft 100, and/or a smart communication device, and/or via a pilot or co-pilot of the aircraft 100 via a flight control system, cockpit controls, or other application specific control system of the aircraft 100. Further, in some embodiments, displacement of the doors 122, 126 may be initiated when the aircraft 100 is operated in hover, descent, or is in a grounded position. Method 200 concludes at block 206 by sliding at least one of the forward sliding door 122 forward with respect to the fuselage 102 and the rearward sliding door 126 rearward with respect to the fuselage 102. Furthermore, method 200 may also include sliding the forward sliding door 122 rearward and the rearward sliding door 126 forward until the doors 122, 126 make contact or make contact with a bump stop 160, 162, and selectively operating the plurality of actuators 136, 138, 146, 148 to retract the doors 122, 126 within the bulkhead of the fuselage 102 to the closed position.

In some embodiments, one or more lateral actuators can be attached to one or more of the rails to provide powered lateral sliding of one or more of the doors 122, 126. In some cases, the lateral actuators can be carried inward and outward along with the inward and outward movement of the doors 122, 126. In some cases, a lateral actuator can be connected between, for example, rails 130 and 134 to laterally move second door 126. One or more actuators can be independently provided for each of the first forward sliding door 122 and the second rearward sliding door 126 to automate lateral movement of the doors both independently and with redundancy.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
    a fuselage having a sliding door system disposed on at least one side of the fuselage, the sliding door system, comprising:
        a forward sliding door having an upper slide rail and a lower slide rail;
        a rearward sliding door having an upper slide rail and a lower slide rail;
        an upper rail coupled to each of the upper slide rail of the forward sliding door and the upper slide rail of the rearward sliding door;
        a lower rail coupled to each of the lower slide rail of the forward sliding door and the lower slide rail of the rearward sliding door; and
        a plurality of actuators coupled to each of the upper rail and the lower rail and configured to displace and retract the forward sliding door and the rearward sliding door linearly with respect to the fuselage;
        wherein at least one of the upper rail and the lower rail are movable relative to the fuselage.

2. The aircraft of claim 1, wherein the forward sliding door and the rearward sliding door are configured to move away from the fuselage simultaneously.

3. The aircraft of claim 1, wherein the forward sliding door and the rearward sliding door are configured to move toward the fuselage simultaneously.

4. The aircraft of claim 1, wherein the forward sliding door is configured to slide forward independent of whether the rearward sliding door is moved rearward or forward.

5. The aircraft of claim 1, wherein the rearward sliding door is configured to slide rearward independent of whether the forward sliding door is moved rearward or forward.

6. The aircraft of claim 1, wherein the rearward sliding door must be moved fully forward and the forward sliding door must be moved fully rearward to retract the rearward sliding door and the forward sliding door toward the fuselage.

7. A sliding door system, comprising:
    a forward sliding door having an upper slide rail and a lower slide rail;
    a rearward sliding door having an upper slide rail and a lower slide rail;
    an upper rail coupled to each of the upper slide rail of the forward sliding door and the upper slide rail of the rearward sliding door;
    a lower rail coupled to each of the lower slide rail of the forward sliding door and the lower slide rail of the rearward sliding door; and
    a plurality of actuators coupled to displace at least one of the upper rail and the lower rail.

8. The sliding door system of claim 7, wherein the forward sliding door and the rearward sliding door are configured to move away from a fuselage simultaneously.

9. The sliding door system of claim 7, wherein the forward sliding door and the rearward sliding door are configured to move toward a fuselage simultaneously.

10. The sliding door system of claim 7, wherein the forward sliding door is configured to slide forward independent of whether the rearward sliding door is moved rearward or forward.

11. The sliding door system of claim 7, wherein the rearward sliding door is configured to slide rearward independent of whether the forward sliding door is moved rearward or forward.

12. The sliding door system of claim 7, wherein the rearward sliding door must be moved fully forward and the forward sliding door must be moved fully rearward to retract the rearward sliding door and the forward sliding door toward a fuselage.

13. A method of operating an aircraft, comprising:
    providing an aircraft comprising a fuselage having a sliding door system disposed on at least one side of the fuselage, the sliding door system comprising a forward sliding door having an upper slide rail and a lower slide rail, a rearward sliding door having an upper slide rail and a lower slide rail, an upper rail coupled to each of the upper slide rail of the forward sliding door and the upper slide rail of the rearward sliding door, a lower rail coupled to each of the lower slide rail of the forward sliding door and the lower slide rail of the rearward sliding door, and a plurality of actuators coupled to each of the upper rail and the lower rail;

selectively operating the plurality of actuators to displace at least one of the upper rail and the lower rail to displace the doors from the fuselage and externally beyond a bulkhead of the fuselage; and sliding at least one of the forward sliding door forward with respect to the fuselage and the rearward sliding door rearward with respect to the fuselage.

14. The method of claim 13, wherein the selectively operating the plurality of actuators is initiated by at least one of: (1) a passenger actuating a door handle associated with one of the forward sliding door and the rearward sliding door, (2) a remotely located control center, (3) a control center proximate to the aircraft, (4) a smart communication device, and (5) a pilot or co-pilot of the aircraft via a flight control system, cockpit controls, or other application specific control system of the aircraft.

15. The method of claim 13, further comprising: sliding the forward sliding door rearward and the rearward sliding door forward until the forward sliding door and the rearward sliding door make contact; and selectively operating the plurality of actuators to retract the doors within the bulkhead of the fuselage to the closed position.

* * * * *